United States Patent
Saishu et al.

(10) Patent No.: US 8,964,006 B2
(45) Date of Patent: Feb. 24, 2015

(54) THREE-DIMENSIONAL DISPLAY APPARATUS AND THREE-DIMENSIONAL VIDEO DISPLAY METHOD

(75) Inventors: Tatsuo Saishu, Tokyo (JP); Yuzo Hirayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 608 days.

(21) Appl. No.: 13/231,336

(22) Filed: Sep. 13, 2011

(65) Prior Publication Data

US 2012/0200677 A1    Aug. 9, 2012

(30) Foreign Application Priority Data

Feb. 4, 2011    (JP) .................................. 2011-23197

(51) Int. Cl.
   *H04N 13/04* (2006.01)
   *G02B 27/22* (2006.01)
(52) U.S. Cl.
   CPC .......... *G02B 27/225* (2013.01); *H04N 13/0415* (2013.01)
   USPC .......................................................... 348/51
(58) Field of Classification Search
   CPC .......................... H04N 13/0415; G02B 27/225
   USPC ...................................... 348/51, 59; 359/462
   See application file for complete search history.

(56) References Cited

U.S. PATENT DOCUMENTS

| | | | |
|---|---|---|---|
| 6,064,424 A | 5/2000 | Van Berkel et al. | |
| 6,801,243 B1 * | 10/2004 | Van Berkel | 348/59 |
| 7,787,008 B2 | 8/2010 | Fukushima et al. | |
| 7,834,903 B2 | 11/2010 | Saishu et al. | |
| 8,233,036 B2 | 7/2012 | Park | |
| 8,427,528 B2 | 4/2013 | Saishu et al. | |
| 8,441,526 B2 | 5/2013 | Saishu et al. | |

(Continued)

FOREIGN PATENT DOCUMENTS

| | | |
|---|---|---|
| CN | 101233766 A | 7/2008 |
| CN | 101361016 A | 2/2009 |

(Continued)

OTHER PUBLICATIONS

Notification of Reason for Rejection issued by the Japanese Patent Office on Jan. 25, 2013, for Japanese Patent Application No. 2011-023197, and English-language translation thereof.

(Continued)

*Primary Examiner* — Gims Philippe
*Assistant Examiner* — Benjamin Pezzner
(74) *Attorney, Agent, or Firm* — Finnegan, Henderson, Farabow, Garrett & Dunner, L.L.P.

(57) ABSTRACT

A three-dimensional display apparatus according to an embodiment includes: a display unit including pixels arranged in a matrix form; and an optical plate opposed to the display unit, the optical plate functioning as a plurality of optical apertures which are extended nearly in a straight line manner in a second direction and arranged in a first direction. Each of the pixels is divided into M sub-pixels respectively comprising M color components arranged in the first direction where M is an integer of at least 1, and Q/B is an integer N, M×P/A is a non-integer, and (Q/B)/(P/A) is a non-integer, where P is a period of the optical apertures in the first direction, Q is a period of the optical apertures in the second direction, A is a period of the pixels in the first direction, and B is a period of the pixels in the second direction.

6 Claims, 16 Drawing Sheets

(56) References Cited

U.S. PATENT DOCUMENTS

| | | |
|---|---|---|
| 8,493,439 B2 | 7/2013 | Park |
| 2006/0227208 A1 | 10/2006 | Saishu |
| 2008/0225113 A1 | 9/2008 | Saishu et al. |

FOREIGN PATENT DOCUMENTS

| | | |
|---|---|---|
| EP | 0 791 847 A1 | 8/1997 |
| JP | 9-236777 | 9/1997 |
| JP | 2001-501073 | 1/2001 |
| JP | 2005-86414 | 3/2005 |
| JP | 2006-174258 | 6/2006 |
| JP | 2007-298995 | 11/2007 |
| JP | 4476905 | 3/2010 |
| KR | 10-2003-0030366 | 4/2003 |
| KR | 10-2009-0023497 | 3/2009 |

OTHER PUBLICATIONS

Notice of Preliminary Rejection issued by the Korean Intellectual Property Office on Oct. 11, 2012, for Korean Patent Application No. 10-2011-98804, and English-language translation thereof.

Saishu, et al., "53.3: Distortion Control in a One-Dimensional Integral Imaging Autostereoscopic Display System with Parallel Optical Beam Groups", SID 04 Digest, pp. 1438-1441, (May 2004).

The First Notification of Opinions of the Examination issued by the State Intellectual Property Office of the People's Republic of China on Dec. 26, 2014, for Chinese Patent Application No. 201110249334.9, and English-language translation thereof.

Office Action issued by the Taiwanese Patent Office on Nov. 21, 2013, for Taiwanese Patent Application No. 100129056, and English-language translation thereof.

The First Notification of Opinions of the Examination issued by the State Intellectual Property Office of the People's Republic of China on Dec. 26, 2013, for Chinese Patent Application No. 201110249334.9, and English-language translation thereof.

State Intellectual Property Office of the People's Republic of China, Second Notification of Opinions of the Examination of Jul. 2, 2014, for Chinese application No. 201110249334.9, 14 pages.

\* cited by examiner

| ANGLE[deg] | M*P/A | P/A | Q/B=N | (Q/B)/(P/A) | 2*(Q/B)/(P/A) | LCM(P,A) | map size | moire |
|---|---|---|---|---|---|---|---|---|
| 8.4270 | 7.11111 | 2.37037 | 16.000 | 6.7500 | 13.5000 | 64 | ◎ | ○ |
| 9.0903 | 7.68000 | 2.56000 | 16.000 | 6.2500 | 12.5000 | 64 | ◎ | ◎ |
| 11.8887 | 10.10526 | 3.36842 | 16.000 | 4.7500 | 9.5000 | 64 | ◎ | ○ |
| 16.6992 | 10.80000 | 3.60000 | 12.000 | 3.3333 | 6.6667 | 18 | ◎ | ◎ |
| 9.0903 | 4.32000 | 1.44000 | 9.000 | 6.2500 | 12.5000 | 36 | ○ | ○ |
| 9.5799 | 4.55696 | 1.51899 | 9.000 | 5.9250 | 11.8500 | 120 | ○ | ○ |
| 9.6197 | 4.57627 | 1.52542 | 9.000 | 5.9000 | 11.8000 | 90 | ◎ | ○ |
| 9.6599 | 4.59574 | 1.53191 | 9.000 | 5.8750 | 11.7500 | 72 | ◎ | ○ |
| 9.7004 | 4.61538 | 1.53846 | 9.000 | 5.8500 | 11.7000 | 20 | ◎ | ◎ |
| 9.7276 | 4.62857 | 1.54286 | 9.000 | 5.8333 | 11.6667 | 54 | ◎ | ◎ |
| 9.7824 | 4.65517 | 1.55172 | 9.000 | 5.8000 | 11.6000 | 45 | ◎ | ◎ |
| 9.8239 | 4.67532 | 1.55844 | 9.000 | 5.7750 | 11.5500 | 120 | ○ | ◎ |
| 9.8658 | 4.69565 | 1.56522 | 9.000 | 5.7500 | 11.5000 | 36 | ◎ | ○ |
| 9.9080 | 4.71616 | 1.57205 | 9.000 | 5.7250 | 11.4500 | 360 | ○ | ○ |
| 9.9506 | 4.73684 | 1.57895 | 9.000 | 5.7000 | 11.4000 | 30 | ◎ | ○ |
| 9.9936 | 4.75771 | 1.58590 | 9.000 | 5.6750 | 11.3500 | 360 | ○ | ○ |
| 10.0080 | 4.76471 | 1.58824 | 9.000 | 5.6667 | 11.3333 | 27 | ◎ | ○ |
| 10.0369 | 4.77876 | 1.59292 | 9.000 | 5.6500 | 11.3000 | 180 | ○ | ○ |
| 10.0806 | 4.80000 | 1.60000 | 9.000 | 5.6250 | 11.2500 | 8 | ◎ | ○ |
| 10.4915 | 5.00000 | 1.66667 | 9.000 | 5.4000 | 10.8000 | 5 | ◎ | ○ |
| 10.5873 | 5.04673 | 1.68224 | 9.000 | 5.3500 | 10.7000 | 180 | ○ | ○ |
| 10.6197 | 5.06250 | 1.68750 | 9.000 | 5.3333 | 10.6667 | 27 | ◎ | ○ |
| 10.6849 | 5.09434 | 1.69811 | 9.000 | 5.3000 | 10.6000 | 90 | ◎ | ○ |
| 10.7843 | 5.14286 | 1.71429 | 9.000 | 5.2500 | 10.5000 | 12 | ◎ | ○ |
| 9.0903 | 3.84000 | 1.28000 | 8.000 | 6.2500 | 12.5000 | 32 | ◎ | ○ |
| 9.7824 | 4.13793 | 1.37931 | 8.000 | 5.8000 | 11.6000 | 40 | ◎ | ○ |
| 9.8239 | 4.15584 | 1.38528 | 8.000 | 5.7750 | 11.5500 | 320 | ○ | ○ |
| 9.8658 | 4.17391 | 1.39130 | 8.000 | 5.7500 | 11.5000 | 32 | ◎ | ○ |
| 9.9080 | 4.19214 | 1.39738 | 8.000 | 5.7250 | 11.4500 | 320 | ○ | ○ |
| 9.9506 | 4.21053 | 1.40351 | 8.000 | 5.7000 | 11.4000 | 80 | ◎ | ○ |
| 9.9936 | 4.22907 | 1.40969 | 8.000 | 5.6750 | 11.3500 | 320 | ○ | ○ |
| 10.0080 | 4.23529 | 1.41176 | 8.000 | 5.6667 | 11.3333 | 24 | ◎ | ○ |
| 10.0369 | 4.24779 | 1.41593 | 8.000 | 5.6500 | 11.3000 | 160 | ○ | ○ |
| 10.0806 | 4.26667 | 1.42222 | 8.000 | 5.6250 | 11.2500 | 64 | ◎ | ○ |
| 10.7843 | 4.57143 | 1.52381 | 8.000 | 5.2500 | 10.5000 | 32 | ◎ | ○ |
| 11.0409 | 4.68293 | 1.56098 | 8.000 | 5.1250 | 10.2500 | 64 | ◎ | ○ |
| 11.6894 | 4.96552 | 1.65517 | 8.000 | 4.8333 | 9.6667 | 48 | ◎ | ○ |
| 11.7683 | 5.00000 | 1.66667 | 8.000 | 4.8000 | 9.6000 | 5 | ◎ | ◎ |
| 11.8887 | 5.05263 | 1.68421 | 8.000 | 4.7500 | 9.5000 | 32 | ◎ | ◎ |

FIG. 11A

| ANGLE[deg] | M*P/A | P/A | Q/B=N | (Q/B)/(P/A) | 2*(Q/B)/(P/A) | LCM(P,A) | map size | moire |
|---|---|---|---|---|---|---|---|---|
| 11.9498 | 5.07937 | 1.69312 | 8.000 | 4.7250 | 9.4500 | 320 | ○ | ◎ |
| 12.0115 | 5.10638 | 1.70213 | 8.000 | 4.7000 | 9.4000 | 80 | ◎ | ○ |
| 12.0948 | 5.14286 | 1.71429 | 8.000 | 4.6667 | 9.3333 | 12 | ◎ | ○ |
| 13.2405 | 5.64706 | 1.88235 | 8.000 | 4.2500 | 8.5000 | 32 | ◎ | ○ |
| 11.8887 | 3.78947 | 1.26316 | 6.000 | 4.7500 | 9.5000 | 24 | ◎ | ○ |
| 13.2405 | 4.23529 | 1.41176 | 6.000 | 4.2500 | 8.5000 | 24 | ◎ | ○ |
| 14.7436 | 4.73684 | 1.57895 | 6.000 | 3.8000 | 7.6000 | 30 | ◎ | ○ |
| 14.9314 | 4.80000 | 1.60000 | 6.000 | 3.7500 | 7.5000 | 8 | ◎ | ○ |
| 15.5241 | 5.00000 | 1.66667 | 6.000 | 3.6000 | 7.2000 | 5 | ◎ | ○ |
| 16.3895 | 5.29412 | 1.76471 | 6.000 | 3.4000 | 6.8000 | 30 | ◎ | ○ |
| 16.6992 | 5.40000 | 1.80000 | 6.000 | 3.3333 | 6.6667 | 9 | ◎ | ◎ |
| 16.8584 | 5.45455 | 1.81818 | 6.000 | 3.3000 | 6.6000 | 20 | ◎ | ○ |
| 17.1027 | 5.53846 | 1.84615 | 6.000 | 3.2500 | 6.5000 | 24 | ◎ | ○ |
| 9.0903 | 2.40000 | 0.80000 | 5.000 | 6.2500 | 12.5000 | 4 | ◎ | ○ |
| 16.3895 | 4.41176 | 1.47059 | 5.000 | 3.4000 | 6.8000 | 25 | ◎ | ○ |
| 16.6992 | 4.50000 | 1.50000 | 5.000 | 3.3333 | 6.6667 | 3 | ◎ | ◎ |
| 16.8584 | 4.54545 | 1.51515 | 5.000 | 3.3000 | 6.6000 | 50 | ◎ | ◎ |
| 17.1027 | 4.61538 | 1.53846 | 5.000 | 3.2500 | 6.5000 | 20 | ◎ | ◎ |
| 17.2275 | 4.65116 | 1.55039 | 5.000 | 3.2250 | 6.4500 | 200 | ○ | ○ |
| 17.3540 | 4.68750 | 1.56250 | 5.000 | 3.2000 | 6.4000 | 25 | ◎ | ○ |
| 9.8239 | 2.07792 | 0.69264 | 4.000 | 5.7750 | 11.5500 | 160 | ○ | ○ |
| 9.8658 | 2.08696 | 0.69565 | 4.000 | 5.7500 | 11.5000 | 16 | ◎ | ○ |
| 9.9080 | 2.09607 | 0.69869 | 4.000 | 5.7250 | 11.4500 | 160 | ○ | ○ |
| 9.9506 | 2.10526 | 0.70175 | 4.000 | 5.7000 | 11.4000 | 40 | ◎ | ○ |
| 9.9936 | 2.11454 | 0.70485 | 4.000 | 5.6750 | 11.3500 | 160 | ○ | ○ |
| 10.0080 | 2.11765 | 0.70588 | 4.000 | 5.6667 | 11.3333 | 12 | ◎ | ◎ |
| 10.0369 | 2.12389 | 0.70796 | 4.000 | 5.6500 | 11.3000 | 80 | ○ | ○ |
| 10.0806 | 2.13333 | 0.71111 | 4.000 | 5.6250 | 11.2500 | 32 | ◎ | ○ |
| 10.7843 | 2.28571 | 0.76190 | 4.000 | 5.2500 | 10.5000 | 16 | ◎ | ○ |
| 11.8887 | 2.52632 | 0.84211 | 4.000 | 4.7500 | 9.5000 | 16 | ◎ | ○ |
| 13.2405 | 2.82353 | 0.94118 | 4.000 | 4.2500 | 8.5000 | 16 | ◎ | ○ |
| 14.9314 | 3.20000 | 1.06667 | 4.000 | 3.7500 | 7.5000 | 16 | ◎ | ○ |
| 17.1027 | 3.69231 | 1.23077 | 4.000 | 3.2500 | 6.5000 | 16 | ◎ | ○ |
| 19.9831 | 4.36364 | 1.45455 | 4.000 | 2.7500 | 5.5000 | 16 | ◎ | ◎ |
| 21.0375 | 4.61538 | 1.53846 | 4.000 | 2.6000 | 5.2000 | 20 | ◎ | ◎ |
| 22.6199 | 5.00000 | 1.66667 | 4.000 | 2.4000 | 4.8000 | 5 | ◎ | ◎ |
| 23.1986 | 5.14286 | 1.71429 | 4.000 | 2.3333 | 4.6667 | 12 | ◎ | ○ |
| 23.9625 | 5.33333 | 1.77778 | 4.000 | 2.2500 | 4.5000 | 16 | ◎ | ○ |
| 24.4440 | 5.45455 | 1.81818 | 4.000 | 2.2000 | 4.4000 | 20 | ◎ | ○ |

FIG. 11B

| ANGLE[deg] | M*P/A | P/A | Q/B=N | (Q/B)/(P/A) | 2*(Q/B)/(P/A) | LCM(P,A) | map size | moire |
|---|---|---|---|---|---|---|---|---|
| 9.4623 | 4.50000 | 1.50000 | 9.000 | 6.0000 | 12.0000 | 3 | ◎ | × |
| 10.3048 | 4.90909 | 1.63636 | 9.000 | 5.5000 | 11.0000 | 18 | ◎ | △ |
| 11.3099 | 5.40000 | 1.80000 | 9.000 | 5.0000 | 10.0000 | 9 | ◎ | × |
| 12.5288 | 6.00000 | 2.00000 | 9.000 | 4.5000 | 9.0000 | 2 | ◎ | △ |
| 14.0362 | 6.00000 | 2.00000 | 8.000 | 4.0000 | 8.0000 | 2 | ◎ | × |
| 15.9454 | 5.14286 | 1.71429 | 6.000 | 3.5000 | 7.0000 | 12 | ◎ | △ |
| 18.4349 | 6.00000 | 2.00000 | 6.000 | 3.0000 | 6.0000 | 2 | ◎ | × |
| 21.8014 | 7.20000 | 2.40000 | 6.000 | 2.5000 | 5.0000 | 12 | ◎ | △ |
| 26.5651 | 6.00000 | 2.00000 | 4.000 | 2.0000 | 4.0000 | 2 | ◎ | × |

FIG. 12

| | | | | | | | | | | | | |
|---|---|---|---|---|---|---|---|---|---|---|---|---|
| B | 3.93330 | 2.93330 | 1.93330 | 0.93330 | 8.93330 | 7.93330 | 6.93330 | 5.93330 | 4.93330 | 3.93330 | | |
| G | 2.00000 | 1.00000 | 0.00000 | 8.00000 | 7.00000 | 6.00000 | 5.00000 | 4.00000 | 3.00000 | 2.00000 | | |
| R | 0.06670 | 8.06670 | 7.06670 | 6.06670 | 5.06670 | 4.06670 | 3.06670 | 2.06670 | 1.06670 | 0.06670 | | |
| B | 7.13330 | 6.13330 | 5.13330 | 4.13330 | 3.13330 | 2.13330 | 1.13330 | 0.13330 | 8.13330 | 7.13330 | | |
| G | 5.20000 | 4.20000 | 3.20000 | 2.20000 | 1.20000 | 0.20000 | 8.20000 | 7.20000 | 6.20000 | 5.20000 | | |
| R | 3.26670 | 2.26670 | 1.26670 | 0.26670 | 8.26670 | 7.26670 | 6.26670 | 5.26670 | 4.26670 | 3.26670 | | |
| B | 1.33330 | 0.33330 | 8.33330 | 7.33330 | 6.33330 | 5.33330 | 4.33330 | 3.33330 | 2.33330 | 1.33330 | | |
| G | 8.40000 | 7.40000 | 6.40000 | 5.40000 | 4.40000 | 3.40000 | 2.40000 | 1.40000 | 0.40000 | 8.40000 | | |
| R | 6.46670 | 5.46670 | 4.46670 | 3.46670 | 2.46670 | 1.46670 | 0.46670 | 8.46670 | 7.46670 | 6.46670 | | |
| B | 4.53330 | 3.53330 | 2.53330 | 1.53330 | 0.53330 | 8.53330 | 7.53330 | 6.53330 | 5.53330 | 4.53330 | | |
| G | 2.60000 | 1.60000 | 0.60000 | 8.60000 | 7.60000 | 6.60000 | 5.60000 | 4.60000 | 3.60000 | 2.60000 | | |
| R | 0.66670 | 8.66670 | 7.66670 | 6.66670 | 5.66670 | 4.66670 | 3.66670 | 2.66670 | 1.66670 | 0.66670 | | |
| B | 7.73330 | 6.73330 | 5.73330 | 4.73330 | 3.73330 | 2.73330 | 1.73330 | 0.73330 | 8.73330 | 7.73330 | | |
| G | 5.80000 | 4.80000 | 3.80000 | 2.80000 | 1.80000 | 0.80000 | 8.80000 | 7.80000 | 6.80000 | 5.80000 | | |
| R | 3.86670 | 2.86670 | 1.86670 | 0.86670 | 8.86670 | 7.86670 | 6.86670 | 5.86670 | 4.86670 | 3.86670 | | |
| B | 1.93330 | 0.93330 | 8.93330 | 7.93330 | 6.93330 | 5.93330 | 4.93330 | 3.93330 | 2.93330 | 1.93330 | | |
| G | 0.00000 | 8.00000 | 7.00000 | 6.00000 | 5.00000 | 4.00000 | 3.00000 | 2.00000 | 1.00000 | 0.00000 | | |
| R | 7.06670 | 6.06670 | 5.06670 | 4.06670 | 3.06670 | 2.06670 | 1.06670 | 0.06670 | 8.06670 | 7.06670 | | |

FIG. 13

| 4.87500 | 3.87500 | 2.87500 | 1.87500 | 0.87500 | 8.87500 | 7.87500 | 6.87500 | 5.87500 | 4.87500 |
|---|---|---|---|---|---|---|---|---|---|
| 3.00000 | 2.00000 | 1.00000 | 0.00000 | 8.00000 | 7.00000 | 6.00000 | 5.00000 | 4.00000 | 3.00000 |
| 1.12500 | 0.12500 | 8.12500 | 7.12500 | 6.12500 | 5.12500 | 4.12500 | 3.12500 | 2.12500 | 1.12500 |
| 8.25000 | 7.25000 | 6.25000 | 5.25000 | 4.25000 | 3.25000 | 2.25000 | 1.25000 | 0.25000 | 8.25000 |
| 6.37500 | 5.37500 | 4.37500 | 3.37500 | 2.37500 | 1.37500 | 0.37500 | 8.37500 | 7.37500 | 6.37500 |
| 4.50000 | 3.50000 | 2.50000 | 1.50000 | 0.50000 | 8.50000 | 7.50000 | 6.50000 | 5.50000 | 4.50000 |
| 2.62500 | 1.62500 | 0.62500 | 8.62500 | 7.62500 | 6.62500 | 5.62500 | 4.62500 | 3.62500 | 2.62500 |
| 0.75000 | 8.75000 | 7.75000 | 6.75000 | 5.75000 | 4.75000 | 3.75000 | 2.75000 | 1.75000 | 0.75000 |
| 7.87500 | 6.87500 | 5.87500 | 4.87500 | 3.87500 | 2.87500 | 1.87500 | 0.87500 | 8.87500 | 7.87500 |
| 6.00000 | 5.00000 | 4.00000 | 3.00000 | 2.00000 | 1.00000 | 0.00000 | 8.00000 | 7.00000 | 6.00000 |
| 4.12500 | 3.12500 | 2.12500 | 1.12500 | 0.12500 | 8.12500 | 7.12500 | 6.12500 | 5.12500 | 4.12500 |
| 2.25000 | 1.25000 | 0.25000 | 8.25000 | 7.25000 | 6.25000 | 5.25000 | 4.25000 | 3.25000 | 2.25000 |
| 0.37500 | 8.37500 | 7.37500 | 6.37500 | 5.37500 | 4.37500 | 3.37500 | 2.37500 | 1.37500 | 0.37500 |
| 7.50000 | 6.50000 | 5.50000 | 4.50000 | 3.50000 | 2.50000 | 1.50000 | 0.50000 | 8.50000 | 7.50000 |
| 5.62500 | 4.62500 | 3.62500 | 2.62500 | 1.62500 | 0.62500 | 8.62500 | 7.62500 | 6.62500 | 5.62500 |
| 3.75000 | 2.75000 | 1.75000 | 0.75000 | 7.75000 | 6.75000 | 5.75000 | 4.75000 | 3.75000 | 3.75000 |
| 1.87500 | 0.87500 | 7.87500 | 6.87500 | 5.87500 | 4.87500 | 3.87500 | 2.87500 | 1.87500 | 1.87500 |
| 0.00000 | 8.00000 | 7.00000 | 6.00000 | 5.00000 | 4.00000 | 3.00000 | 2.00000 | 1.00000 | 0.00000 |

FIG. 14

THREE-DIMENSIONAL DISPLAY APPARATUS AND THREE-DIMENSIONAL VIDEO DISPLAY METHOD

CROSS-REFERENCE TO RELATED APPLICATION

This application is based upon and claims the benefit of priority from prior Japanese Patent Application No. 2011-23197 filed on Feb. 4, 2011 in Japan, the entire contents of which are incorporated herein by reference.

FIELD

Embodiment described herein relate generally to a three-dimensional display apparatus and a three-dimensional video display method.

BACKGROUND

As for a three-dimensional video display apparatus capable of conducting moving picture display, which is the so-called three-dimensional display, various schemes are known. In recent years, demands for especially a scheme which is a flat panel type and which does not need dedicated glasses have been increased. In the three-dimensional video display apparatus of this type, a scheme in which an optical plate for controlling light rays from a display panel and directing the light rays to a viewer is disposed immediately before the display panel (hereafter referred to as display device) having fixed pixel positions such as a liquid crystal display device or a plasma display device of direct view type or projection type is known.

The optical plate controls light rays to cause different images to be viewed according to the angle even in the same position on the optical plate. Specifically, when giving only the lateral parallax (horizontal disparity), a slit array or a lenticular sheet (cylindrical lens array) is used. When up-down parallax (vertical disparity) is also included, a pinhole array or a fly eye lens array is used. Schemes using the optical plate are further classified into binocular, multiview, super multiview (super multiview condition of the multiview) and integral imaging. The basic principle of them is substantially the same as that which was invented approximately 100 years before and which have been used in stereoscopic photography.

Among them, the integral imaging scheme has a feature that the degree of freedom of the viewpoint position is high and stereoscopic view is facilitated. In the type having only the horizontal disparity and having no vertical disparity, implementation of a display device having a high resolution is also comparatively easy. On the other hand, in the binocular or multiview scheme, there is a problem that the range of the viewpoint position in which stereoscopic view is possible, i.e., the viewing zone is narrow and it is hard to view. However, the configuration as a three-dimensional video display apparatus is the simplest and the display image can also be generated simply.

In a direct view type autostereoscopic video display apparatus using such a slit array or a lenticular sheet, moiré or color moiré is apt to be caused by interference between a periodic structure of apertures of the optical plate and a periodic structure of pixels on the plane display device. As its countermeasure, a method of inclining the extension direction of the apertures of the optical plate is known. However, the moiré cannot be dissolved completely only by providing the apertures of the optical plate with inclination. Therefore, a method of adding a diffusion component to dissolve the moiré is also proposed. Since this method aggravates the separation of parallax information (image information which changes in view according to the angle of viewing), however, degradation of the picture quality is inevitable. In the case where the apertures of the optical plate are made oblique, the moiré is apt to occur if the periodicity of the position relation between the optical plate and pixels is high whereas the moiré is not apt to occur if the periodicity is low. In the case where the periodicity is low, there is a problem that processing of rearranging video data for three-dimensional video display becomes complicated and the circuit scale and the required memory become large. Furthermore, rearrangement mapping which reduces the memory is known.

In the conventional three-dimensional video display apparatus having optical apertures disposed obliquely on an optical plate, there is a problem in reconciling the dissolving of the moiré and efficiency improvement of the image processing as described above.

BRIEF DESCRIPTION OF THE DRAWINGS

FIGS. 11A and 11B are diagrams showing examples of a combination of position relations between pixels and an optical plate, an angle and a period, and a map size (the number of necessary columns) and a moiré simulation result in each case, which are used in an embodiment;

FIG. 12 is a diagram showing examples of a combination of position relations between pixels and an optical plate, an angle and a period, and a map size (the number of necessary columns) and a moiré simulation result in each case, which are used in a comparative example;

FIG. 13 is a diagram showing an example of position relations between pixels and an optical plate and parallax numbers assigned to respective sub-pixels, which are used in an embodiment;

FIG. 14 is a diagram showing another example of position relations between pixels and an optical plate and parallax numbers assigned to respective sub-pixels, which are used in an embodiment.

DETAILED DESCRIPTION

A three-dimensional display apparatus according to an embodiment includes a display unit including pixels arranged in a matrix form along a first direction and a second direction perpendicular to the first direction, and an optical plate installed so as to be opposed to the display unit, the optical plate functioning as a plurality of optical apertures which are extended nearly in a straight line manner in the second direction and arranged in the first direction. Each of the pixels is divided into M sub-pixels respectively having M color components arranged in the first direction where M is an integer of at least 1, and Q/B is an integer N, M×P/A is a non-integer, and (Q/B)/(P/A) is a non-integer, where P is a period of the optical apertures in the first direction, Q is a period of the optical apertures in the second direction, A is a period of the pixels in the first direction, and B is a period of the pixels in the second direction.

Hereafter, a three-dimensional video display apparatus according to embodiments will be described with reference to the drawings.

An outline of a three-dimensional video display apparatus according to each embodiment will now be described with reference to FIGS. 1 to 4(c). In both the integral imaging scheme and the multiview scheme, typically the viewing distance is finite and consequently a display image is generated to make a perspective projection image at that viewing distance actually visible.

Figure 1:
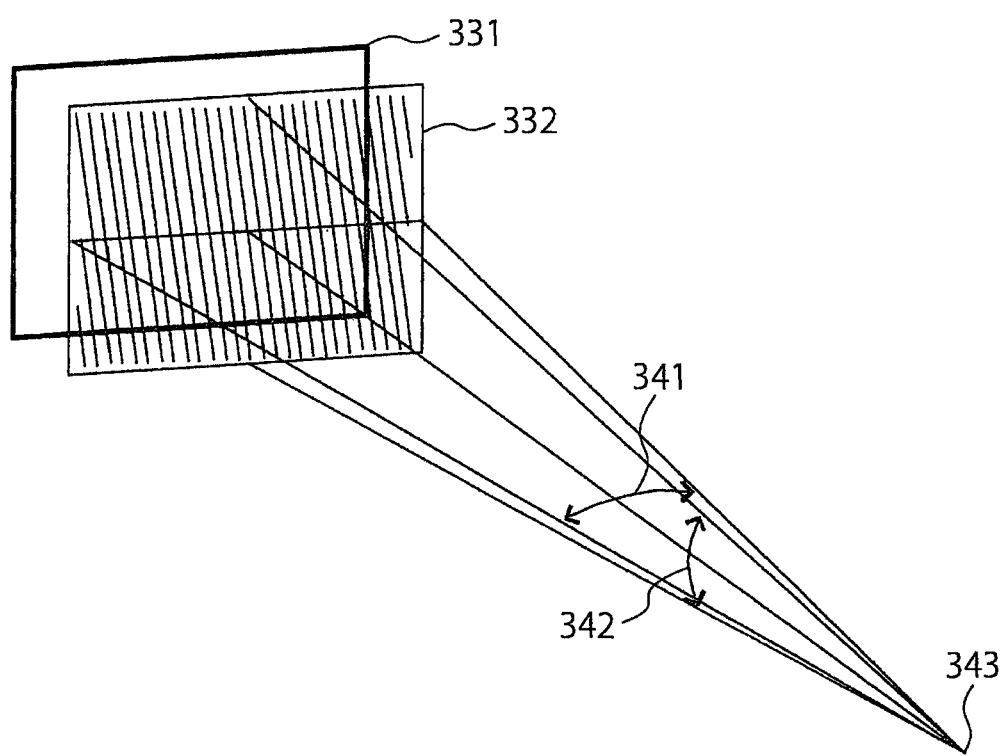
FIG. 1 is an oblique view which schematically shows a three-dimensional video display apparatus according to an embodiment.

FIG. 1 is an oblique view which schematically shows the whole of the three-dimensional video display apparatus according to each embodiment. The display apparatus which displays a three-dimensional video, shown in FIG. 1 includes a plane video display unit 331 which displays a parallax interleaved image as a plane video. An optical plate 332 which controls light rays illuminated from the plane video display unit 331 is provided in front of the plane video display unit 331. As the plane video display unit 331, a lenticular sheet 334 shown in FIG. 2(a), a slit array sheet 333 shown in FIG. 2(b), or a switching type (active type) optical plate in which the lens effect or a slit can be turned on or off electrically is used. The optical plate 332 includes optical apertures. If the optical plate is the lenticular sheet 334, the optical apertures correspond to respective cylindrical lenses. If the optical plate is the slit array sheet 333, the optical apertures correspond to respective slits provided in the slit array sheet 333. The optical apertures in the optical plate 332 substantially restrict light rays illuminated from the display unit 331 and directed to a viewing zone in which a three-dimensional video is displayed. The optical apertures are provided to be associated with respective elemental images which constitute a two-dimensional video displayed on the display unit 331. Therefore, an output video displayed on the display unit 331 is formed of as many elemental images as a number associated with the number of optical apertures in the optical plate 332. As a result, the elemental images are projected toward a space in the viewing zone respectively via the optical apertures of the optical plate 332. Consequently, a three-dimensional video is displayed in front of or behind the three-dimensional video display apparatus. Furthermore, in ensuing embodiments, the optical apertures (lens or slits) are arranged to extend in a direction inclined from pixel columns in the longitudinal direction of the plane video display apparatus. In FIGS. 2(a) and 2(b), Ps denotes a horizontal pitch of the optical apertures. In FIG. 2(b), Pp denotes a width of a slit. In switching optical plates of one type, a liquid crystal layer is sandwiched between one pair of substrates and a voltage is applied between electrodes periodically arranged on a first substrate included in the pair of substrates and electrode formed on a second substrate. As a result, electric field distribution is generated in the liquid crystal layer to change the alignment of the liquid crystal layer and generate refractive index distribution which acts as a lens. In switching optical plates of another type, polarized light which is input to a double refraction lens formed of liquid crystal is switched by another liquid crystal cell.

Figure 2:
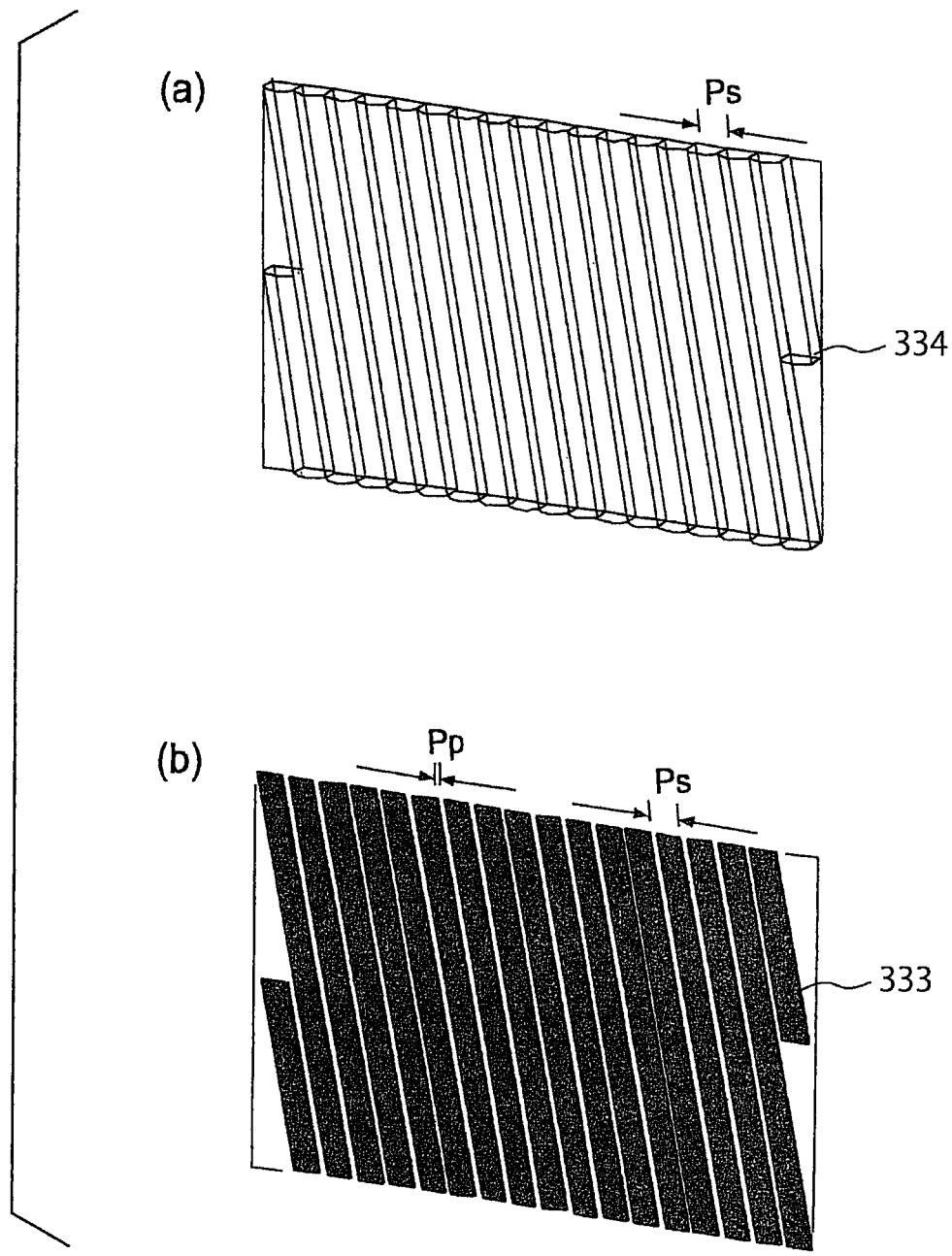
FIGS. 2(a) and 2(b) are oblique views which schematically show an optical plate according to an embodiment.
Figure 3:
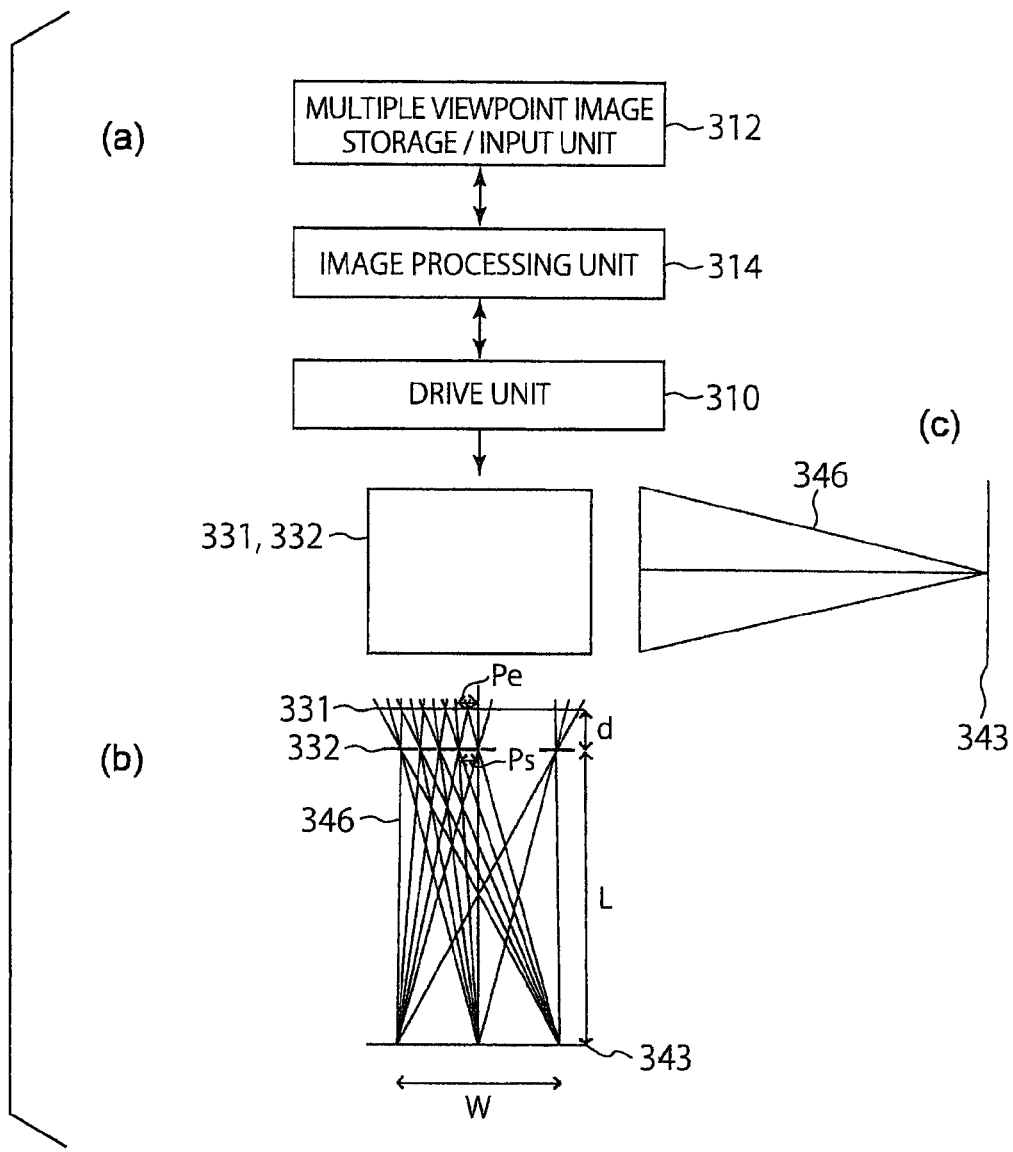
FIGS. 3(a) to 3(c) are schematic diagrams showing relations among an elemental image pitch Pe, an optical aperture pitch Ps of an optical plate, an optical plate gap d, a viewing distance L and a viewing zone width W in a three-dimensional video display apparatus according to an embodiment.
Figure 4:
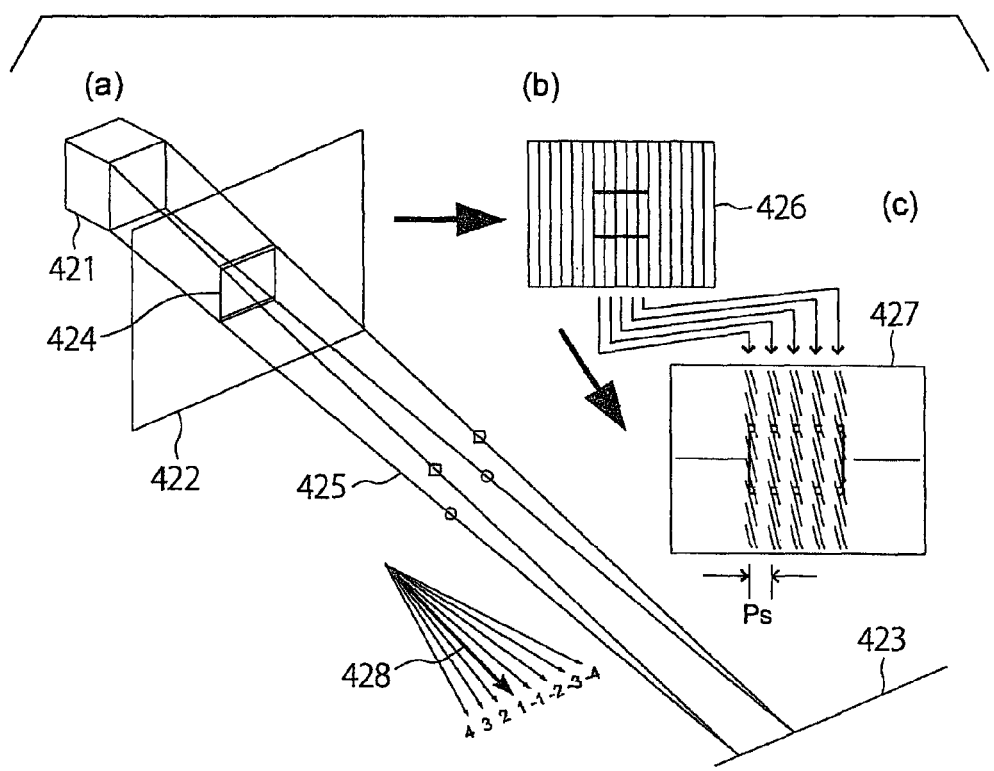
FIGS. 4(a) to 4(c) are diagrams showing a method for forming a parallax image and a stereoscopic image in the one-dimensional integral imaging and multiview schemes under the condition having a set of parallel light rays according to an embodiment.

FIGS. 3(a) to 3(c) are oblique views which schematically show the whole of a three-dimensional video display apparatus. As mission demands, a spacer (a glass substrate, a resin substrate, a film, a diffusion sheet, or a combination of them) is provided between the plane image display unit 331 and the optical plate 332. FIG. 3(a) is a front view showing a front face of the three-dimensional video display apparatus and a control unit formed of a drive unit 310, a multiple viewpoint image storage/input unit 312, and an image processing unit 314. FIG. 3(b) is a top view showing an image disposition in the three-dimensional video display apparatus. FIG. 3(c) is a side view of the three-dimensional video display apparatus. As shown in FIGS. 1 to 2(b), the three-dimensional video display apparatus includes the plane video display unit 331 such as a liquid crystal display element and the optical plate 332 having optical apertures.

In the three-dimensional video display apparatus, in the range of a viewing angle 341 in the horizontal direction and a viewing angle 342 in the vertical direction, it is possible to view the plane video display unit 331 via the optical plate 332 from a eye position and view a stereoscopic image in front of and behind the plane video display unit 331. Here, the number of pixels in the plane video display unit 331 is the number obtained when counting pixels groups each of which forms a minimum unit and takes the shape of a square. For example, the number of pixels in the lateral direction (horizontal direction) is 3,840 and the number of pixels in the longitudinal direction (vertical direction) is 2,160. It is supposed that each pixel group of the minimum unit includes red (R), green (G) and blue (B) sub pixels.

If in FIG. 3(b) a viewing distance L between the optical plate 332 and a viewing distance plane 343, a pitch Ps of the optical apertures in the optical plate in the horizontal direction, and a gap d between the optical plate and the plane video display unit are determined, then an elemental image pitch Pe is determined by an interval obtained by projecting optical aperture centers from a viewpoint on the viewing distance plane 343 onto the display plane. A reference numeral 346 denotes a line which couples the viewpoint position to a center of each optical aperture. A viewing zone width W is determined on the basis of a condition that elemental images do not overlap each other on a display plane of the display device. As already described, the elemental image corresponds to a two-dimensional interleaved image (a part of a parallax interleaved image which is a final output video) displayed by a set of sub-pixels generating a light ray flux which is passed through a certain optical aperture of the optical plate 332 and directed to a viewing zone between the optical plate 332 and the viewing distance plane 343. A plurality of elemental images are displayed on the display unit 331 and they are projected. As a result, a three-dimensional video is displayed.

The plane video display unit 331 is driven by a display signal supplied from the drive unit 310 to display the parallax interleaved image on the plane video display unit 331. The drive unit 310 has the multiple viewpoint image storage/input unit 312 as its peripheral device to compress a multiple viewpoint video group or a coupled image formed thereof and store or input a result as stereoscopic image data. Furthermore, the drive unit 310 has the image processing unit 314 as its peripheral device to convert video data supplied from the multiple viewpoint image storage/input unit 312 to a parallax interleaved image and extract pixel data.

In the parallel light ray one-dimensional integral imaging scheme in which the horizontal pitch Ps of the optical apertures or its integer times is determined to be an integer times the pixel pitch Pp, an average pitch Pe of elemental images which are determined to be associated with respective optical apertures and which contribute to display of a stereoscopic image, or its integer times does not become an integer times the sub-pixel pitch Pp and has a fraction to become slightly greater than an integer. Also in a wide sense one-dimensional integral imaging scheme in which the horizontal pitch Ps of the optical apertures or its integer times is not determined to be an integer times the pixel pitch Pp (a parallel light ray group is not formed), typically the average pitch Pe of elemental images or its integer times has a fraction which is a deviation from an integer times the sub-pixel pitch Pp in the same way. On the other hand, in the multiview scheme, the average pitch Pe of elemental images or its integer times is determined to be an integer times the sub-pixel pitch Pp. In the one-dimensional integral imaging scheme in which the optical apertures of the optical plate are disposed obliquely at an angle of $\tan^{-1}(1/S)$ with respect to pixel columns, the horizontal pitch Ps of the optical apertures is divided by the sub-pixel horizontal pitch Pp, a resultant quotient is multiplied by S, a resultant product is divided by the number of color components (typically 3), and a resultant value (integer) is referred to as "the number of parallaxes." For example, if Ps/Pp=12 at an angle of $\tan^{-1}(1/4)$, the number of parallaxes is 12×4/3=16. If Ps/Pp=4.5 at an angle of $\tan^{-1}(1/4)$, the number of parallaxes is 4.5×6/3=9.

FIGS. 4(a) to 4(c) show a constitution method of a parallax image and a stereoscopic image in the one-dimensional integral scheme and the multiview scheme under the condition having a set of parallel light rays. An object (subject) 421 to be displayed is projected onto a projection plane 422 which is located in the same position as a plane on which the optical plate of the three-dimensional video display apparatus is actually located. In the one-dimensional integral imaging scheme at this time, as shown in FIG. 4(a), projection is conducted along a projection line 425 directed toward a projection center line 423 which is parallel to a projection plane, which is located on the front (center in the up-down direction), and which is in the viewing distance plane to implement perspective projection in the vertical direction and orthographic projection in the horizontal projection. The projection lines do not intersect each other in the horizontal direction. In the vertical direction, however, the projection lines intersect at the projection center line. Each projection direction is associated with a parallax number. However, the directions are not located at equal angles, but are located at equal intervals on the viewing distance plane (projection center line). In other words, it is equivalent to shooting by translating a camera (in a constant direction) on the projection center line at equal intervals. In the projection method in the case of multiview, perspective projection is conducted with respect to the projection center point. By the way, no matter whether to conduct the one-dimensional integral imaging or conduct typical perspective projection in the same way as the multiview, there is substantially no problem except slight distortion is caused in the stereoscopic image. Each parallax component image 426 projected in this way is divided every pixel column, subjected to interpolation processing as occasion demands, separated from each other at intervals corresponding to the horizontal pitch Ps of the optical plate as shown in FIG. 4(c), and disposed on a parallax interleaved image 427. Since the optical apertures are disposed in an oblique direction, the same column on the parallax component image 426 is disposed generally in the vertical direction, but disposed obliquely in each part to meet the optical apertures. The parallax component images are disposed on the parallax interleaved image in an interleaved form to form an elemental image array.

First Embodiment

Figure 5:
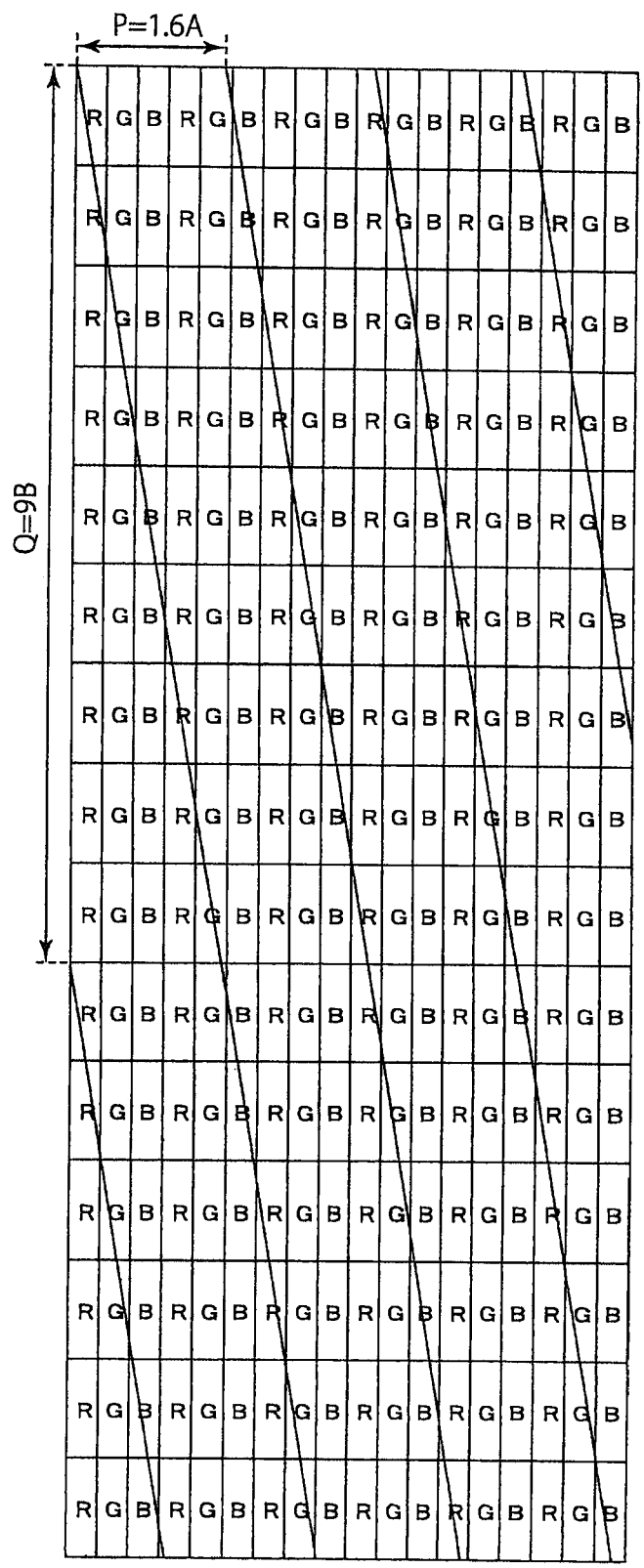
FIG. 5 is a diagram showing position relations between pixels and an optical plate used in a first embodiment.

An example of position relations between pixels and the optical plate which are used in the three-dimensional video display apparatus according to a first embodiment is shown in FIG. 5. Each oblique line represents an intermediate line of an optical aperture of the optical plate. In other words, in the case where the optical plate is a lens array, each oblique line represents a lens boundary. In the case where the optical plate is a slit array, each oblique line represents an intermediate line of a slit. The inclination angle of the optical apertures is $\tan^{-1}(1.6/9)$ ($=\tan^{-1}(1/5.625)$) with respect to the pixel columns. Each pixel is divided into three sub-pixels respectively having three color components (R, G and B) arranged in the lateral direction. A lateral period P of the optical apertures, i.e., an interval in the lateral direction between oblique lines shown in FIG. 5 is not an integer times a pitch (lateral period) A of pixels in the lateral direction, but is 1.6 times. A longitudinal period Q of the optical apertures, i.e., an interval in the longitudinal direction between oblique lines shown in FIG. 5 is an integer times a pitch (longitudinal period) B of pixels in the longitudinal direction, i.e., nine times (N=(Q/B)=9). Furthermore, (N/(P/A)), i.e., 9/1.6 (=5.625) is not an integer, i.e., is a non-integer, and 2×9/1.6 is not an integer either, i.e., is a non-integer. By making the longitudinal period of the optical apertures equal to an integer times (nine times) the longitudinal period of pixels in this way, mapping for rearranging the input multiple viewpoint video to a video to be output to the plane video display unit has a period corresponding to nine pixel rows in the output video and a memory corresponding to nine rows suffices for mapping. By the way, the mapping will be described in detail later.

Furthermore, in the present embodiment, the lateral period Ps of the optical apertures is not an integer times the lateral period Pp of pixels. Therefore, the periodicity of position relations between the optical plate and pixels is low to an extent that the moiré is dissolved. In addition, five times the lateral period P of the optical apertures coincides with eight times the lateral period A of the pixels. In other words, a minimum value which becomes an integer when P/A is multiplied by an integer is eight. This value satisfies the condition of the range of 9/2 (=N/2) to 9×10 (N×10).

In this way, the period at which an integer times the lateral period of the optical apertures coincides with an integer times the lateral period of pixels is set to correspond to an integer column of pixels which is not too small and which is not too large, and the longitudinal period of the optical apertures is set to correspond to an integer row of pixels. This brings about merits that the periodicity is low enough to dissolve the moiré and a memory corresponding to an integer (nine) rows by an integer (eight) columns of pixels suffices for mapping of image rearrangement processing.

It becomes possible to reconcile the moiré dissolving and efficiency improvement of image processing by adopting the configuration described heretofore. It is now supposed that each pixel has M sub-pixels having M color components in the horizontal direction (lateral direction) where M is an integer of at least 1. In the first embodiment and second to fifth embodiments described later, M becomes 3. Thereupon, in the lateral direction, there is one lateral period of optical apertures. In the range of (N/(P/A)) pixel rows in the longitudinal direction, there are N×M, i.e., 9×3=27 sub-pixels. If three color components are assigned to one viewpoint, therefore, assignment corresponding to nine viewpoints is possible. It is suitable to map information corresponding to one pixel (having three color components) by nine viewpoints into this range. If there is an input image corresponding to only two viewpoints, it is suitable to convert the image corresponding to two viewpoints to an image corresponding to nine viewpoints and conduct mapping in the same way as the case of nine viewpoints.

By the way, in the first embodiment, a color filter provided in the plane video display device has a longitudinal stripe arrangement as appreciated from FIG. 5. This is true of second to fourth embodiments described hereafter as well.

Second Embodiment

Figure 6:
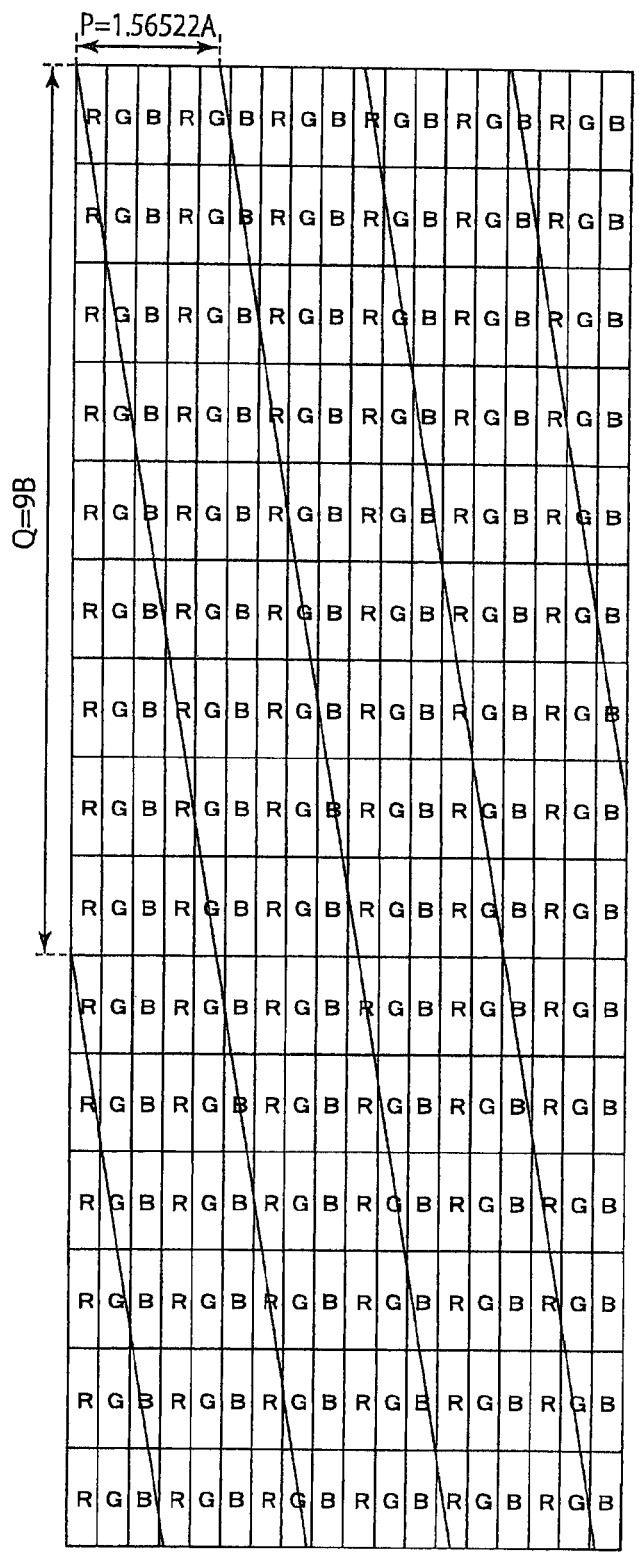
FIG. 6 is a diagram showing an example of position relations between pixels and an optical plate used in a second embodiment.

An example of position relations between pixels and the optical plate which are used in the three-dimensional video display apparatus according to a second embodiment is shown in FIG. 6. In the second embodiment, optical apertures of the optical plate have a period corresponding to pixels of nine rows in the longitudinal direction in the same way as the first embodiment. However, the second embodiment differs from the first embodiment in the inclination angle of the optical apertures and the lateral period. The inclination angle of the optical apertures is $\tan^{-1}(1.56522/9)$ ($=\tan^{-1}(1/5.75)$) with respect to the pixel columns. Each pixel is divided into three sub-pixels respectively having three color components (R, G and B) arranged in the lateral direction. A lateral period P of the optical apertures, i.e., an interval in the lateral direction between oblique lines shown in FIG. 6 is not an integer times a lateral period A of pixels, but is 1.56522 times. A longitudinal period Q of the optical apertures, i.e., an interval in the longitudinal direction between oblique lines shown in FIG. 6 is an integer times a longitudinal period B of pixels, i.e., nine times (N=(Q/B)=9). Furthermore, (N/(P/A)), i.e., 9/1.56522 (=5.75) is not an integer. And 2×9/1.56522 which is twice that is not an integer either. Furthermore, twenty-three times the lateral period P of the optical apertures coincides with thirty-six times the lateral period A of the pixels. In other words, a minimum value which becomes an integer when P/A is multiplied by an integer is thirty-six. This value satisfies the condition of the range of 9/2 (=N/2) to 9×10 (N×10).

In this way, the period at which an integer times the lateral period of the optical apertures coincides with an integer times the lateral period of pixels is set to correspond to an integer columns of pixels which is not too small and which is not too large, and the longitudinal period of the optical apertures is set to an integer times the longitudinal period of pixels. This brings about merits that the periodicity is low enough to dissolve the moiré and a memory corresponding to an integer (nine) rows by an integer (thirty-six) columns of pixels suffices for mapping of image rearrangement processing.

It becomes possible to reconcile the moiré dissolving and efficiency improvement of image processing by adopting the configuration described heretofore. In the range of one lateral period of optical apertures in the lateral direction and (N/(P/A)) pixel rows in the longitudinal direction, there are N×M, i.e., 9×3=27 sub-pixels. If three color components are assigned to one viewpoint, therefore, assignment corresponding to nine viewpoints is possible. It is suitable to map information corresponding to one pixel (having three color components) by nine viewpoints into this range. If there is an input image corresponding to only two viewpoints, it is suitable to convert the image corresponding to two viewpoints to an image corresponding to nine viewpoints and conduct mapping in the same way as the case of nine viewpoints.

Third Embodiment

Figure 7:
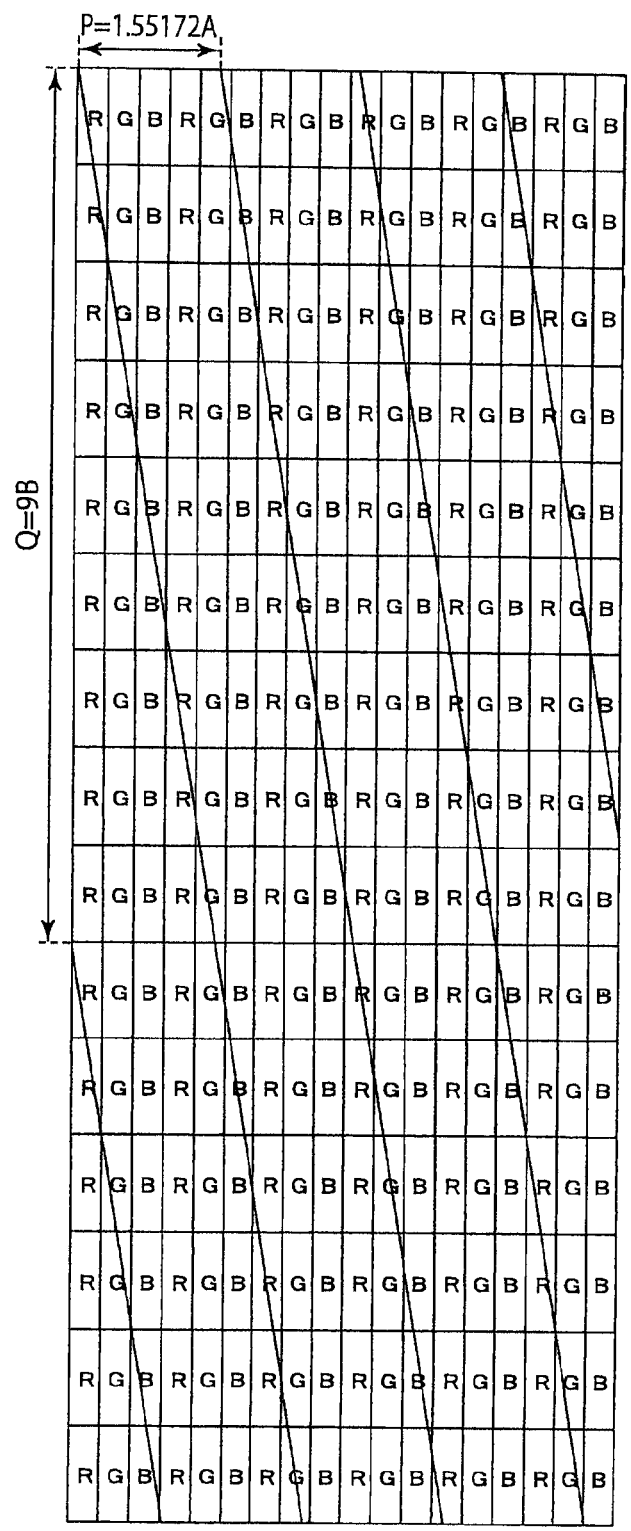
FIG. 7 is a diagram showing an example of position relations between pixels and an optical plate used in a third embodiment.

Position relations between pixels and the optical plate which are used in the three-dimensional video display apparatus according to a third embodiment is shown in FIG. 7. In the third embodiment, optical apertures of the optical plate have a period corresponding to pixels of nine rows in the longitudinal direction in the same way as the first and second embodiments. However, the third embodiment differs from the first and second embodiments in the inclination angle of the optical apertures and the lateral period. The inclination angle of the optical apertures is $\tan^{-1}(1.55172/9)$ ($=\tan^{-1}(1/5.8)$) with respect to the pixel columns. Each pixel is divided into three sub-pixels respectively having three color components (R, G and B) arranged in the lateral direction. A lateral period P of the optical apertures, i.e., an interval in the lateral direction between oblique lines shown in FIG. 7 is not an integer times a lateral period A of pixels, but is 1.55172 times. A longitudinal period Q of the optical apertures, i.e., an interval in the longitudinal direction between oblique lines shown in FIG. 7 is an integer times a longitudinal period B of pixels, i.e., nine times (N=(Q/B)=9). Furthermore, (N/(P/A)), i.e., 9/1.55172 (=5.8) is not an integer. And twice that is not an integer either. Furthermore, twenty-nine times the lateral period of the optical apertures coincides with forty-five times the lateral period of the pixels. In other words, a minimum value which becomes an integer when P/A is multiplied by an integer is forty-five. This value satisfies the condition of the range of 9/2 (=N/2) to 9×10 (N×10

In this way, the period at which an integer times the lateral period of the optical apertures coincides with an integer times the lateral period of pixels is set to correspond to an integer columns of pixels which is not too small and which is not too large, and the longitudinal period of the optical apertures is set to an integer times the longitudinal period of pixels. This brings about merits that the periodicity is low enough to dissolve the moiré and a memory corresponding to an integer (nine) rows by an integer (forty-five) columns of pixels suffices for mapping of image rearrangement processing.

It becomes possible to reconcile the moiré dissolving and efficiency improvement of image processing by adopting the configuration described heretofore. In the range of one lateral period of optical apertures in the lateral direction and (N/(P/A)) pixel rows in the longitudinal direction, there are N×M, i.e., 9×3=27 sub-pixels. If three color components are assigned to one viewpoint, therefore, assignment corresponding to nine viewpoints is possible. It is suitable to map information corresponding to one pixel (having three color components) by nine viewpoints into this range. If there is an input image corresponding to only two viewpoints, it is suitable to convert the image corresponding to two viewpoints to an image corresponding to nine viewpoints and conduct mapping in the same way as the case of nine viewpoints.

Fourth Embodiment

Figure 8:
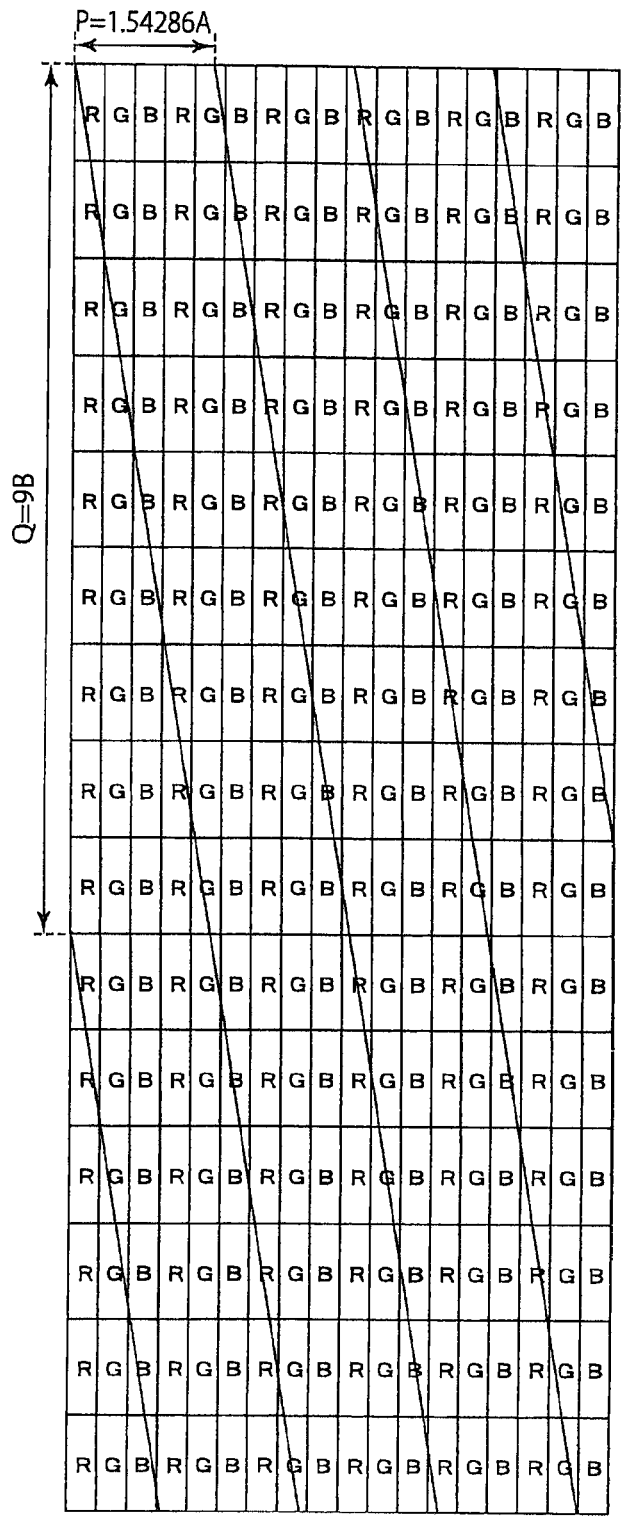
FIG. 8 is a diagram showing an example of position relations between pixels and an optical plate used in a fourth embodiment.

Position relations between pixels and the optical plate which are used in the three-dimensional video display apparatus according to a fourth embodiment is shown in FIG. 8. In the fourth embodiment, optical apertures of the optical plate has a period corresponding to pixels of nine rows in the longitudinal direction in the same way as the first to third embodiments. However, the fourth embodiment differs from the first to third embodiments in the inclination angle of the optical apertures and the lateral period. The inclination angle of the optical apertures is $\tan^{-1}(1.54286/9)$ ($=\tan^{-1}(1/5.833)$) with respect to the pixel columns. Each pixel is divided into three sub-pixels respectively having three color components (R, G and B) arranged in the lateral direction. A lateral period P of the optical apertures, i.e., an interval in the lateral direction between oblique lines shown in FIG. 8 is not an integer times a lateral period A of pixels, but is 1.54286 times. A longitudinal period Q of the optical apertures, i.e., an interval in the longitudinal direction between oblique lines shown in FIG. 8 is an integer times a longitudinal period B of pixels, i.e., nine times (N=(Q/B)=9). Furthermore, (N/(P/A)), i.e., 9/1.54286 (=5.833) is not an integer. And twice that is not an integer either. Furthermore, thirty-five times the lateral period of the optical apertures coincides with fifty-four times the lateral period of the pixels. In other words, a minimum value which becomes an integer when P/A is multiplied by an integer is fifty-four. This value satisfies the condition of the range of 9/2 (=N/2) to 9×10 (=N×10).

In this way, the period at which an integer times the lateral period of the optical apertures coincides with an integer times the lateral period of pixels is set to correspond to an integer columns of pixels which is not too small and which is not too large, and the longitudinal period of the optical apertures is set to an integer times the longitudinal period of pixels. This brings about merits that the periodicity is low enough to dissolve the moiré and a memory corresponding to an integer (nine) rows by an integer (fifty-four) columns of pixels suffices for mapping of image rearrangement processing.

It becomes possible to reconcile the moiré dissolving and efficiency improvement of image processing by adopting the configuration described heretofore. In the range of one lateral period of optical apertures in the lateral direction and (N/(P/A)) pixel rows in the longitudinal direction, there are N×M, i.e., 9×3=27 sub-pixels. If three color components are assigned to one viewpoint, therefore, assignment corresponding to nine viewpoints is possible. It is suitable to map information corresponding to one pixel (having three color components) by nine viewpoints into this range. If there is an input image corresponding to only two viewpoints, it is suitable to convert the image corresponding to two viewpoints to an image corresponding to nine viewpoints and conduct mapping in the same way as the case of nine viewpoints.

COMPARATIVE EXAMPLE

Figure 9:
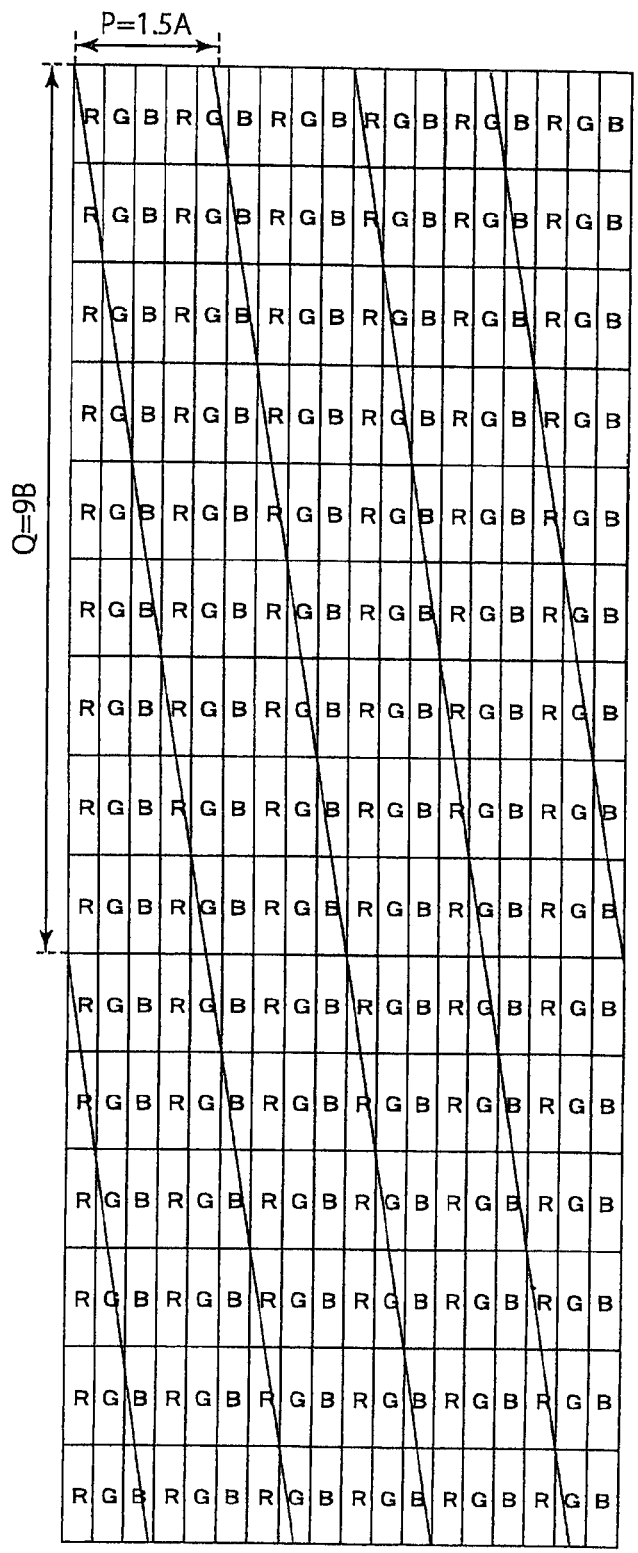
FIG. 9 is a diagram showing an example of position relations between pixels and an optical plate used in a comparative example.

Position relations between pixels and the optical plate which are used in the three-dimensional video display apparatus according to a comparative example is shown in FIG. 9. In the comparative example, optical apertures of the optical plate has a period corresponding to pixels of nine rows in the longitudinal direction in the same way as the first to fourth embodiments. However, the comparative example differs from the first to fourth embodiments in the inclination angle of the optical apertures and the lateral period. The inclination angle of the optical apertures is $\tan^{-1}(1.5/9)$ ($=\tan^{-1}(1/6)$) with respect to the pixel columns. Each pixel is divided into three sub-pixels respectively having three color components (R, G and B) arranged in the lateral direction. A lateral period P of the optical apertures, i.e., an interval in the lateral direction between oblique lines shown in FIG. 9 is not an integer times a lateral period A of pixels, but is 1.5 times. A longitudinal period Q of the optical apertures, i.e., an interval in the longitudinal direction between oblique lines shown in FIG. 9 is an integer times a longitudinal period B of pixels, i.e., nine times (N=(Q/B)=9). However, (N/(P/A)), i.e., 9/1.5 (=6) is an integer. And twice that is also an integer. Furthermore, twice the lateral period of the optical apertures coincides with three times the lateral period of the pixels. In other words, a minimum value which becomes an integer when P/A is multiplied by an integer is three. This value does not satisfy the condition of the range of 9/2 (=N/2) to 9×10 (=N×10). The periodicity which is too high in this way is not desirable, because moiré occurs.

Fifth Embodiment

Figure 10:
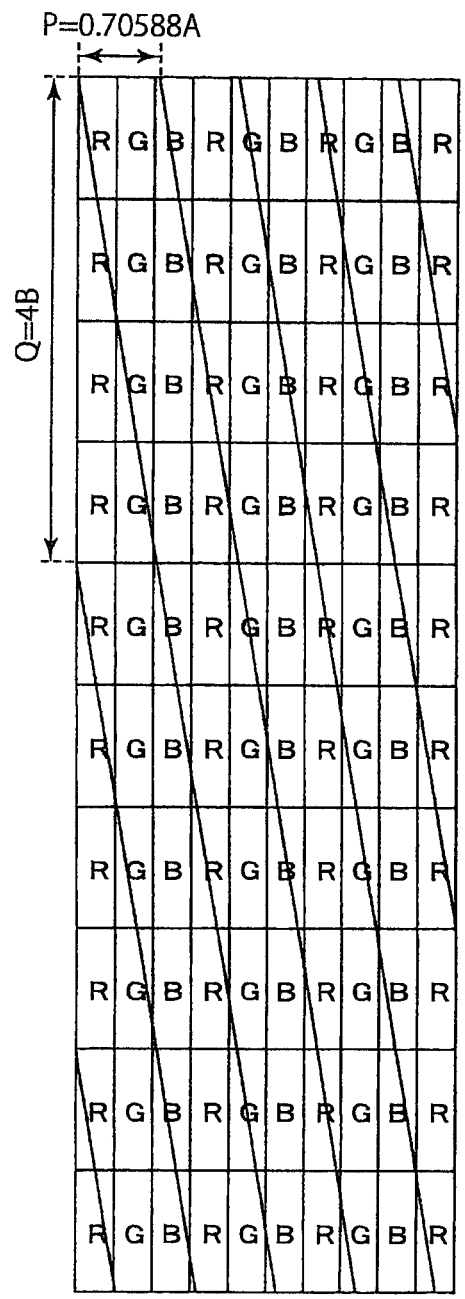
FIG. 10 is a diagram showing an example of position relations between pixels and an optical plate used in a fifth embodiment.

Position relations between pixels and the optical plate which are used in the three-dimensional video display apparatus according to a fifth embodiment is shown in FIG. 10. In the fifth embodiment, optical apertures of the optical plate has a period corresponding to pixels of four rows in the longitudinal direction unlike the first to fourth embodiments. The inclination angle of the optical apertures is $\tan^{-1}(0.70588/4)$ ($=\tan^{-1}(1/5.667)$) with respect to the pixel columns. Each pixel is divided into three sub-pixels respectively having three color components (R, G and B) arranged in the lateral direction. A lateral period P of the optical apertures, i.e., an interval in the lateral direction between oblique lines shown in FIG. 10 is not an integer times a lateral period A of pixels, but is 0.70588 times. A longitudinal period Q of the optical apertures, i.e., an interval in the longitudinal direction between oblique lines shown in FIG. 10 is an integer times a longitudinal period B of pixels, i.e., four times (N=(Q/B)=4). Furthermore, (N/(P/A)), i.e., 4/0.70588 (=5.667) is not an integer. And twice that is not an integer either. Furthermore, three times the lateral period of the optical apertures coincides with three times the lateral period of the pixels. In other words, a minimum value which becomes an integer when P/A is multiplied by an integer is three. This value satisfies the condition of the range of 4/2 (=N/2) to 4×10 (=N×10).

In this way, the period at which an integer times the lateral period of the optical apertures coincides with an integer times the lateral period of pixels is set to correspond to an integer columns of pixels which is not too small and which is not too large, and the longitudinal period of the optical apertures is set to an integer times the longitudinal period of pixels. This brings about merits that the periodicity is low enough to dissolve the moiré and a memory corresponding to an integer (four) rows by an integer (three) columns of pixels suffices for mapping of image rearrangement processing.

It becomes possible to reconcile the moiré dissolving and efficiency improvement of image processing by adopting the configuration described heretofore. In the range of one lateral period of optical apertures in the lateral direction and (N/(P/A)) pixel rows in the longitudinal direction, there are N×M, i.e., 4×3=12 sub-pixels. If three color components are assigned to one viewpoint, therefore, assignment corresponding to four viewpoints is possible. It is suitable to map information corresponding to one pixel (having three color components) by four viewpoints into this range. If there is an input image corresponding to only two viewpoints, it is suitable to convert the image corresponding to two viewpoints to an image corresponding to four viewpoints and conduct mapping in the same way as the case of four viewpoints.

(Simulation Results)

Examples of a combination of position relations between pixels and the optical plate, the angle (inclination angle) and the period, and a map size (the number of necessary columns) and a moiré simulation result in each case, which are used in a three-dimensional video display apparatus according to an embodiment are shown in FIGS. 11A and 11B. Among them, a column LCM(P, A) represents a minimum value which becomes an integer when P/A is multiplied by an integer. For suppressing the generation of moiré, the value is desired to be at least N/2. For saving the memory capacity required for mapping, the value is especially desired to be 10×N or less. A value which yields a small map size and which is especially desirable is indicated by a double circle in a column of "Map size." If restrictions are not placed especially on the memory size, the value indicated by a single circle also has no problem. In the rightmost column "moiré," a value which is especially high in the moiré suppression effect is indicated by a double circle. A value at which moiré remains as compared with the case indicated by the double circle, but the moiré is within the allowable range is indicated by a circle. A configuration in which the moiré is especially suppressed corresponds to the value of (Q/B)/(P/A) which is in the range of the number of parallaxes×(0.55 to 0.8) or the range of the number of parallaxes×(1.25 to 1.45). Especially desired configuration corresponds to the value of (Q/B)/(P/A) which is in the range of the number of parallaxes×(0.6 to 0.65) or the range of the number of parallaxes×(1.4 to 1.45). If the number of parallaxes is great in value, the above-described range becomes a desirable range with respect to a value obtained by dividing the number of parallaxes by a suitable integer.

FIG. 12 shows examples of a combination of position relations between pixels and an optical plate, an angle (inclination angle) and a period, and a map size (the number of necessary columns) and a moiré simulation result in each case, which are used in the three-dimensional video display apparatus according to the comparative example. Since (P/A)/(Q/B) or 2×(P/A)/(Q/B) is an integer, the periodicity is too high and moiré is apt to occur. Accordingly, they are not desirable. In the rightmost column "moiré," a value at which moiré is especially apt to occur is indicated by "×" and a value at which moiré is apt to occur is indicated by "Δ." A configuration in which the moiré is especially apt to occur corresponds to the value of (Q/B)/(P/A) which is in the range of the number of parallaxes×(0.8 to 1.2). If the number of parallaxes is great in value, the above-described range becomes an undesirable range with respect to a value obtained by dividing the number of parallaxes by a suitable integer.

FIGS. 13 and 14 are diagrams showing examples of position relations between pixels and an optical plate and parallax numbers (viewpoint numbers) assigned to respective sub-pixels, which are used in a three-dimensional video display apparatus according to an embodiment. Inclination angles and pitches of optical plates shown in FIGS. 13 and 14 are the same as those shown in FIGS. 7 and 5, respectively. A point indicated by an arrow is a place where an intermediate line of each optical aperture of the optical plate is located on a substantially middle point between two green sub-pixels disposed to be adjacent in the longitudinal direction. The two green sub-pixels are assigned 0 and 8 located at ends of parallax numbers 0 to 8 of nine parallaxes. If a parallax number assigned to a sub-pixel is an integer, pixels from only a video of a single viewpoint included in a multiple viewpoint video are mapped and assigned. Many other sub-pixels are assigned parallax numbers which are not integers. If a parallax number assigned to a sub-pixel is not an integer, however, pixels from videos of two adjacent viewpoints included in a multiple viewpoint video are averaged according to the ratio of numerals of parallax numbers and assigned. Averaging pixels from two viewpoints is equivalent to interpolation processing between parallax images and degrades the video slightly. Therefore, it is desirable that the number of sub-pixels which are not subject to interpolation processing, i.e., which are assigned with integer parallax numbers is large. If the number of sub-pixels which are assigned with integer parallax numbers is too large, however, the periodicity becomes too high and moiré becomes apt to occur. In a configuration which is dropped in periodicity to some degree in order to suppress the moiré, sub-pixels assigned with integer parallax numbers occupy a limited ratio. In the example shown in FIG. 14, sub-pixels assigned with integer parallax numbers appear equally in R, G and B colors. In the example shown in FIG. 13, however, only one color in RGB becomes an integer in parallax number. In such a case, a configuration in which a color of sub-pixels assigned with integer parallax numbers is the green color (G) which is high in visual recognizability and an important color component among R, G and B brings about an improved picture quality. In both configurations shown in FIGS. 13 and 14, at least a part of green sub-pixels are mapped only from pixels of a video of a single viewpoint.

Figure 15:
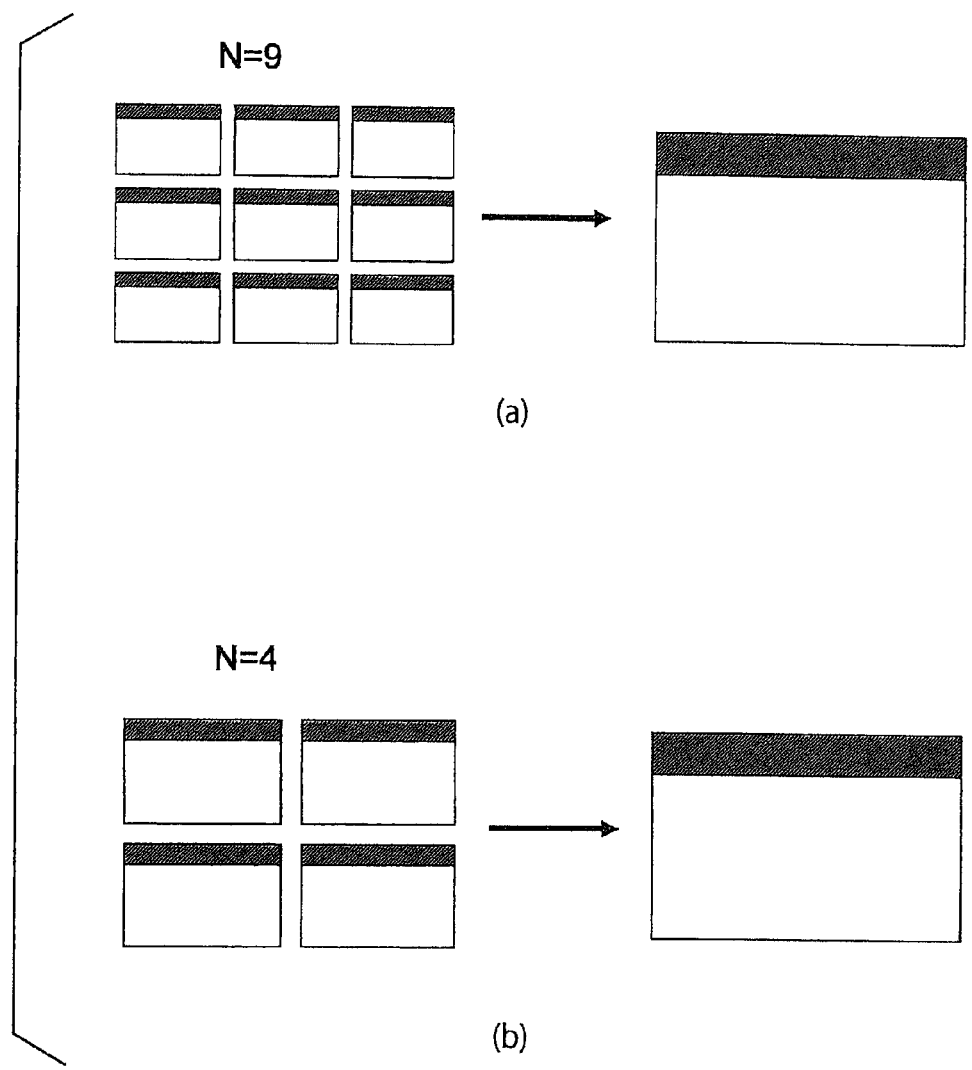
FIGS. 15(a) and 15(b) are diagrams showing examples of mapping in rearrangement processing of a multiple viewpoint video to an output video in an embodiment.

FIGS. 15(a) and 15(b) are schematic diagrams showing mapping in rearrangement processing of a multiple viewpoint video to an output video which is used in a three-dimensional video apparatus according to an embodiment. Its basic mapping method is similar to that described in Japanese Patent No. 4476905. In an example of N=9 shown in FIG. 15(a), three-row shaded regions of multiple viewpoint videos of nine viewpoints shown on the left side are mapped to a nine-row region of an output video shown on the right side. Viewpoint numbers and coordinates of multiple viewpoint videos mapped to sub-pixels in an output image are disposed with nine row periods. Since mapping is conducted with periods of nine rows, a memory corresponding to nine rows suffices for mapping. In addition, if the mapping column period LCM(P, A) is small as shown in FIGS. 11A and 11B, the required memory can be further reduced by periodically using mapping corresponding to 9 rows by LCM(P,A) columns. By the way, the multiple viewpoint image of nine viewpoints may be generated by conducting conversion processing on multiple viewpoint videos of at least two viewpoints which are input.

In an example of N=4 shown in FIG. 15(b), two-row shaded regions of multiple viewpoint videos of four viewpoints shown on the left side are mapped to a four-row region of an output video shown on the right side. Viewpoint numbers and coordinates of multiple viewpoint videos mapped to sub-pixels in an output image are disposed with four row periods. Since mapping is conducted with periods of four rows, a memory corresponding to four rows suffices for mapping. By the way, the multiple viewpoint image of four viewpoints may be generated by conducting conversion processing on multiple viewpoint videos of at least two viewpoints which are input.

In the three-dimensional video display apparatus having an optical plate disposed obliquely, the periodicity in position relations between the optical plate and pixels is low enough to dissolve the moiré and high enough to cause a memory corresponding to N rows to suffice for mapping of image rearrangement processing owing to the method described heretofore. Therefore, it becomes possible to reconcile the moiré dissolving and efficiency improvement of image processing.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

What is claimed is:

1. A three-dimensional display apparatus comprising:
    a display unit comprising pixels arranged in a matrix form along a first direction and a second direction perpendicular to the first direction; and
    an optical plate installed so as to be opposed to the display unit, the optical plate functioning as a plurality of optical apertures which are extended in a third direction crossing the first direction and the second direction, and arranged in a direction perpendicular to the third direction,
    wherein
    each of the pixels is divided into M sub-pixels respectively comprising M color components arranged in the first direction where M is an integer of at least 1, and
    Q/B is an integer N, M×P/A is a non-integer, and (Q/B)/(P/A) is a non-integer, where P is a length of each of the optical apertures in the first direction in units of pixels, Q is a length of each of the optical apertures in the second direction in units of pixels, A is a length of each pixel in the first direction, and B is a length of each pixel in the second direction.

2. The apparatus according to claim 1, wherein 2×(Q/B)/(P/A) is a non-integer.

3. The apparatus according to claim 1, wherein a minimum value which becomes an integer when P/A is multiplied by an integer is in a range of N/2 to N×10.

4. The apparatus according to claim 2, wherein
    each of the pixels on the display unit comprises an R sub-pixel, a G sub-pixel and a B sub-pixel, and
    the optical apertures function to cause a parallax number assigned to a G sub-pixel to become an integer.

5. A three-dimensional video display method for displaying a three-dimensional video by using the three-dimensional video display apparatus according to claim 1, the three-dimensional video display method comprising:
    assigning a parallax number to each pixel in an output video so that parallax numbers assigned to pixels in the output video have a length of N pixel rows along the first direction; and
    rearranging pixels included in a multiple viewpoint video corresponding to a plurality of viewpoints in accordance with the assigned parallax number.

6. The apparatus according to claim 1, further comprising a processor which assigns a parallax number to each pixel in output video so that parallax numbers assigned to pixels in the output video have a length of N pixel rows along the first direction and rearranges pixels included in a multiple viewpoint video corresponding to a plurality of viewpoints in accordance with the assigned parallax number.

* * * * *